United States Patent [19]

Chamberlin et al.

[11] Patent Number: 4,952,308

[45] Date of Patent: Aug. 28, 1990

[54] PRESSURIZED FLOTATION MODULE AND METHOD FOR PRESSURIZED FOAM SEPARATION

[75] Inventors: Jeffrey L. Chamberlin, Lebanon Springs, N.Y.; Michael A. McCool, Pittsfield, Mass.

[73] Assignee: Beloit Corporation, Beloit, Wis.

[21] Appl. No.: 939,997

[22] Filed: Dec. 10, 1986

[51] Int. Cl.$^5$ .................. B03D 1/04; B03D 1/24
[52] U.S. Cl. ........................ 209/170; 162/4; 162/55; 210/221.2; 261/DIG. 75
[58] Field of Search ................. 209/164, 170; 210/221.1, 221.2, 703; 162/4, 55; 261/65, 77, DIG. 75, 121.1, 122, 123

[56] References Cited

U.S. PATENT DOCUMENTS

| Re. 16,279 | 3/1926 | Ellis | 209/166 |
|---|---|---|---|
| 1,155,861 | 10/1915 | Wood | 209/164 |
| 1,164,188 | 12/1915 | Hovland | 209/169 |
| 1,237,961 | 8/1917 | Schwarz | 209/166 |
| 1,240,824 | 9/1917 | Clawson | 209/170 |
| 1,401,055 | 12/1921 | Dosenbach | 209/170 |
| 2,922,521 | 1/1960 | Schranz | 209/164 |
| 3,428,175 | 2/1969 | Hukki | 209/164 |
| 3,784,468 | 1/1974 | Garcia | 209/170 |
| 3,846,299 | 11/1974 | Krasnoff | 209/164 |
| 4,066,540 | 1/1978 | Wada | 209/170 |
| 4,094,783 | 6/1978 | Jackson | 209/170 |
| 4,162,972 | 7/1979 | Green | 209/170 |
| 4,190,522 | 2/1980 | Trä | 209/170/ |
| 4,214,982 | 7/1980 | Pfalzer | 209/164 |
| 4,226,705 | 10/1980 | Lecoffre | 209/164 |
| 4,279,743 | 7/1981 | Miller | 209/170 |
| 4,331,534 | 3/1982 | Barnscheidt | 209/164 |
| 4,560,474 | 12/1985 | Holik | 209/170 |
| 4,564,457 | 1/1986 | Cairo | 209/170 |

FOREIGN PATENT DOCUMENTS

| 692499 | 8/1964 | Canada | 209/164 |
|---|---|---|---|
| 2737009 | 2/1979 | Fed. Rep. of Germany . | |
| 3312070 | 10/1984 | Fed. Rep. of Germany . | |
| 950445 | 8/1982 | U.S.S.R. | 209/168 |
| 15292 | of 1911 | United Kingdom | 209/170 |

OTHER PUBLICATIONS

W. Krukowski; "Przerobka Mechaniczna Kopalin" PWN, Warsaw 1955, pp. 184–189.

Primary Examiner—David L. Lacey
Assistant Examiner—Thomas M. Lithgow
Attorney, Agent, or Firm—Dirk J. Veneman; Raymond W. Campbell

[57] ABSTRACT

A method and several embodiments of apparatus are disclosed for use in foam flotation separation. The method discloses performing the separation in a module operated at nonatmospheric pressure, and the apparatus disclosed are suitable for use as the module of the method. Both the method and the apparatus contemplate positive and negative pressure operation.

3 Claims, 4 Drawing Sheets

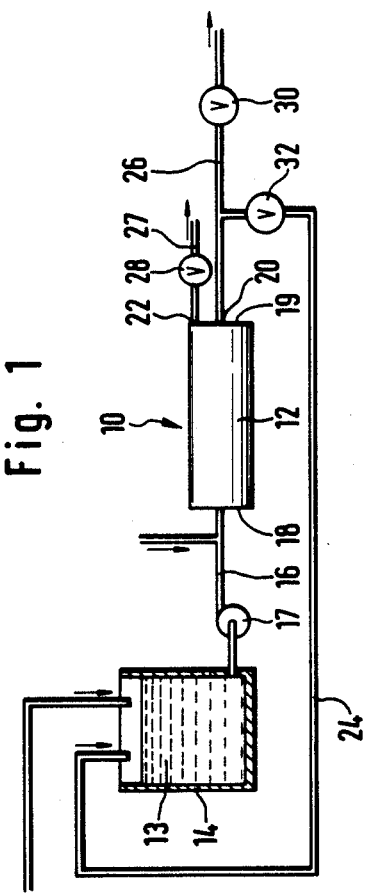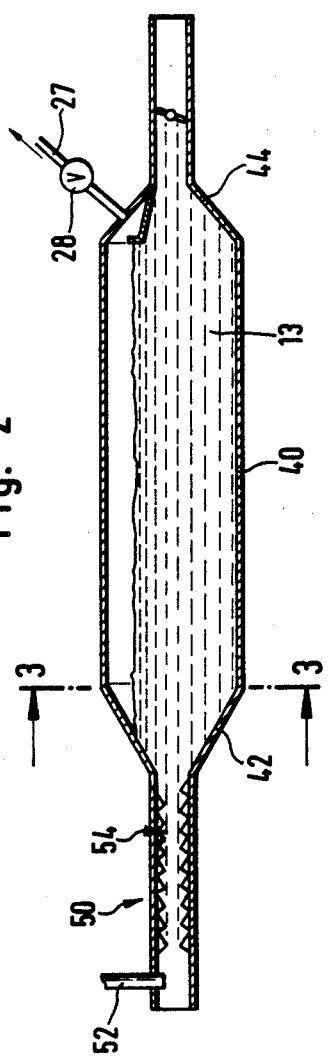

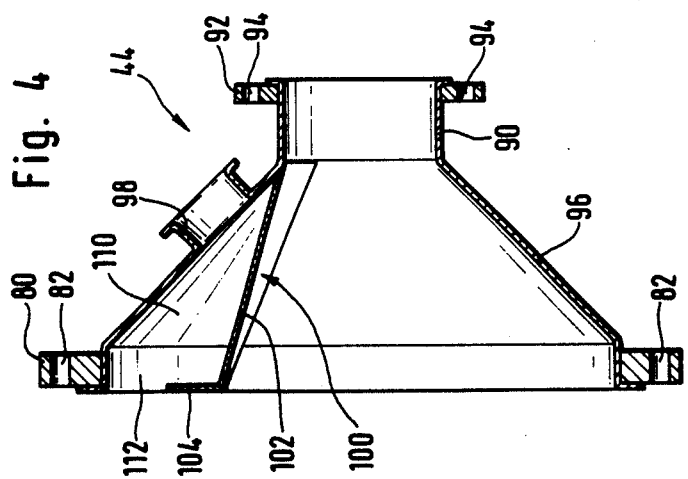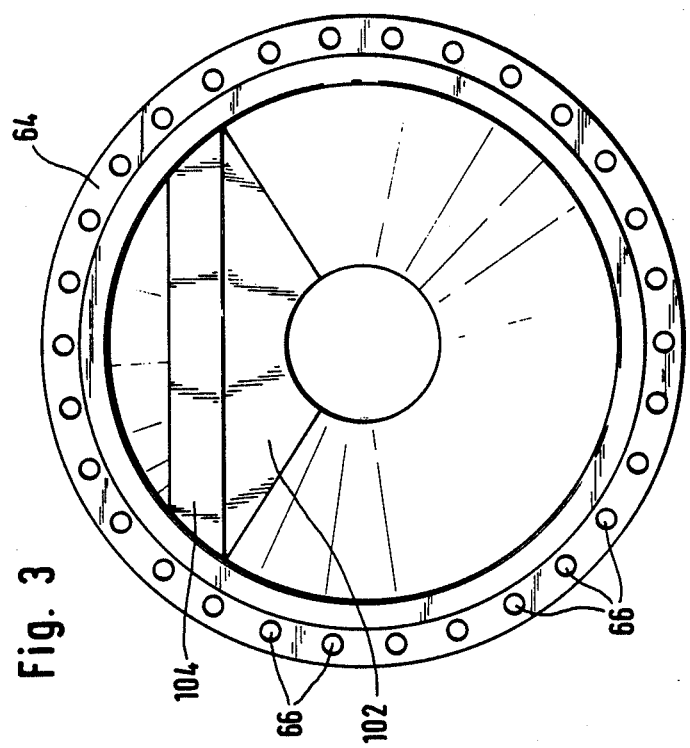

ated system for a system to remove the re-
PRESSURIZED FLOTATION MODULE AND METHOD FOR PRESSURIZED FOAM SEPARATION

BACKGROUND OF THE INVENTION i. Field of the Invention

The present invention relates generally to froth flotation separation and has particular use in the field of deinking of paper in a process for recycling waste paper. More specifically, the invention concerns an apparatus and method for separating ink-laden foam from a slurry of the paper stock.

ii. Description of the Related Art

Froth flotation is a subdivision of a general separation technique known as adsorptive bubble separation. In froth flotation, particles are selectively separated by the differing abilities of different particles to adhere to air bubbles rising through a bulk liquid, and to be held at the liquid surface in a foam or froth.

Flotation separation is frequently used in a variety of processes for various purposes. For example, selective flotation can be used to separate minerals, and total flotation is used for clarification by removing all solids. Recently, a developing application for flotation separation has been for ink removal in the field of paper recycling.

Various factors have contributed to development in the art of recycling waste papers for the purpose of repulping the paper to form paper. Recycling makes use of a readily available source of materials, the waste paper or discarded papers which would otherwise present disposal problems. Normally, this represents a very inexpensive and readily available source of material, thus providing an economic incentive for the papermaker to recycle waste paper. Increased ecological awareness has resulted in a demand by various populations to recycle paper, thereby eliminating the disposal problem and the resultant ecological impact. Therefore, there are incentives for the papermaker to encourage consumers to recycle paper and for the papermaker himself to use recycled fiber. Use of recycled fiber often can provide a less expensive paper product than using virgin fiber, and there is an economic incentive on the part of consumers to encourage papermakers to use recycled fiber as well as for the consumer himself to make available waste paper for recycling.

The process of waste paper recycling is essentially one of removing contaminants from usable fiber. In the deinking of wastepaper, which is a significant portion of the overall wastepaper recycling market, one of the critical steps is removing ink from a slurry of pulp fibers. Typically, the paper to be recycled is repulped in some fashion, and a slurry of the recycled fibers is made. Chemicals are added to separate the ink particles from the fiber, and to disperse the ink Particles freely in the pulp slurry. Various different processes and chemicals can be used, which do not constitute a part of the invention and will not be described in further detail.

After the ink has been separated from the fiber it must be removed from the pulp slurry. Two processes for removing the ink particles from the slurry have been used by most recyclers, the selection of which often depends on various characteristics of the fiber being recycled and the ink to be removed. A first process for removing the ink particles is often referred to as dilution washing which essentially rinses the ink particles from the pulp.

A second type of ink separation is generally referred to as froth flotation. In froth flotation separation, pulp of low consistency is passed through a series of flotation cells. Air is mixed with the stock along with flotation chemicals such as fatty acids or surfactants. The ink particles have a greater affinity for the air bubbles than do the paper fibers, and the ink particles attach to the bubbles. The bubbles rise to the surface in the flotation cell, forming an ink-laden froth which can be continuously removed from the slurry surface. Removal of the froth is accomplished by gravity, by vacuum or with paddles or other skimming devices at the surface. The froth flotation process can also be used for removing various adhesive contaminants known as stickies from the pulp slurry as well.

Generally, less than thirty per cent of the total ink present in the slurry will be removed in a single froth flotation cell. Therefore, it has been a common practice in the past to provide four to six flotation cells in a series to remove an acceptable portion of the ink originally present in the repulped slurry. Each deinking cell requires various valves, pumps and associated apparatus including piping for providing slurry to the cell, the air injecting and mixing apparatus, chemical addition, froth removal and slurry removal. Therefore, the capital investment necessary for a system to remove the required portion of the ink from recycled fiber can be quite high.

Known froth flotation cells are all of an atmospheric type. That is, the slurry in the cell is at atmospheric pressure. The air injected into the slurry to float the ink particles is allowed to escape to the atmosphere. A typical example of the heretofore known froth flotation deinking cells can be found in U.S. Pat. No. 4,548,673. While a cover is often provided on the deinking cell, the cell remains to operate at atmospheric pressure. For example, U.S. Pat. No. 4,328,095 discloses a series of covered chambers; however, the chamber operates at atmosoheric pressure.

SUMMARY OF THE INVENTION

It is therefore an object of the present invention to provide a pressurized flotation module for removing froth from a slurry in an efficient manner, and which can eliminate much of the piping, pumps and valves heretofore necessary in froth flotation processes.

Another object of the present invention is to provide a pressurized flotation module for froth flotation deinking processes which can be operated in a single unit to achieve suitable contaminant removal without requiring duplication of froth removal apparatus.

Still another object of the present invention is to provide a pressurized flotation module for deinking of pulp slurries which can be operated at pressure above atmospheric pressure, and in which the air escaped from the slurry can be caused to perform useful work.

A still further object of the present invention is to provide a pressurized flotation module for deinking pulp slurry which reduces the foam reject volume and reduces yield losses when compared with heretofore known types of froth flotation cells, and which is readily adaptable for design to various system size requirements, including high volume systems, with minimal space requirements.

These and other objects are achieved in the present invention by providing a flotation separation method and a flotation module which can be operated under nonatmospheric pressure in place of the heretofore known atmospheric flotation methods and modules. The flotation module of the present invention can encompass many different shapes and includes an inlet receiving stock from a mixing zone in which air and/or foaming agents are added to the slurry. An outlet is provided for the acceptable portion of the stock, and a foam outlet is provided for removing the ink-laden foam from the slurry. In preferred embodiments of the module a baffle is provided between the foam and stock outlets, to direct stock toward the stock outlet and the ink-laden foam toward the foam outlet. Valves control the flow rate at the stock outlet and the foam outlet. To simulate the operation of consecutive deinking cells, various portions of the accepted slurry can be recirculated to the inlet end. The method and module can be operated under positive or negative pressure.

Additional objects and advantages of the invention will be apparent from the following detailed description and the accompanying drawings.

BRIEF DESCRIPTION OF THE DRAWINGS

FIG. 1 is a schematic view of a deinking system utilizing a pressurized flotation module according to the present invention;

FIG. 2 is a longitudinal cross sectional diagramatic view of a pressurized flotation module according to the present invention, showing slurry in the module;

FIG. 3 is an enlarged cross sectional view of a presurized flotation module, taken generally along line 3—3 of FIG. 2;

FIG. 4 is an enlarged longitudinal cross sectional view of the outlet cone of the pressurized flotation module;

DETAILED DESCRIPTION OF THE PREFERRED EMBODIMENT

Figure 5:
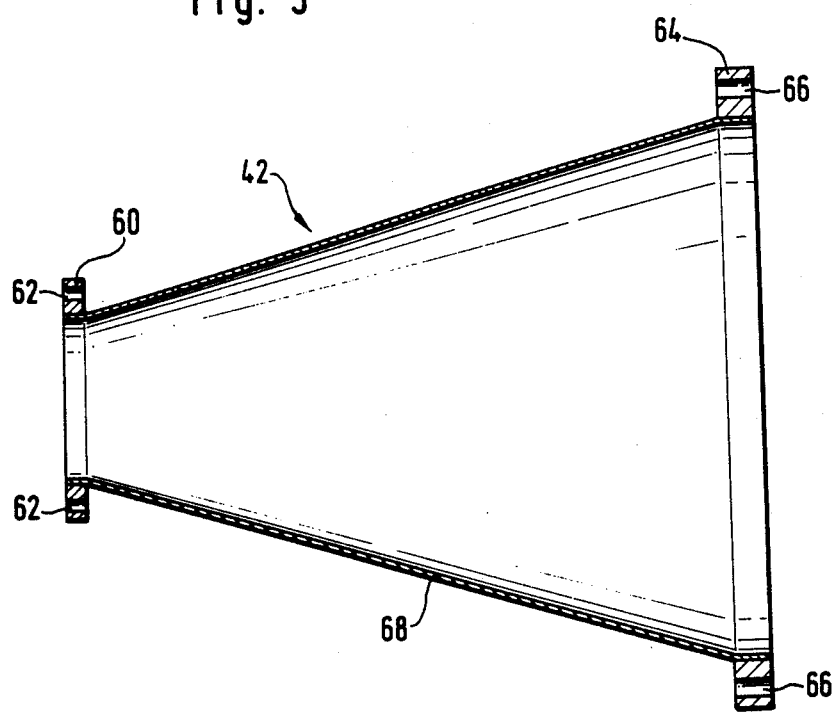
FIG. 5 is an enlarged longitudinal cross sectional view of the inlet cone of the pressurized flotation module.
Figure 6:
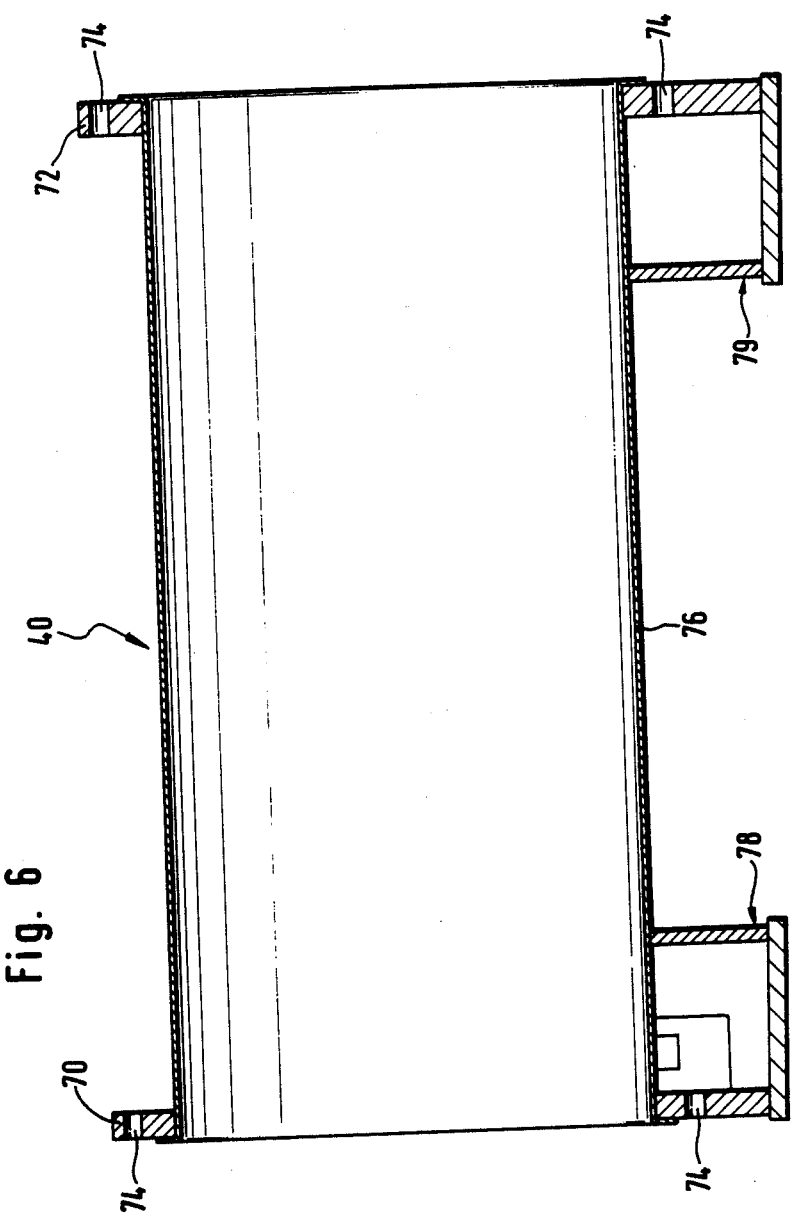
FIG. 6 is an enlarged longitudinal cross sectional view of the central body portion of the pressurized flotation module.

Referring now more specifically to the drawings and to FIG. 1 in particular, numeral 10 designates a froth flotation system in which a pressurized flotation module 12, according to the present invention, can be utilized. System is shown to be a system for deinking recycled waste paper; however, the module 12 can be used for other purposes such as mineral separation, fluid clarification and the like. In the deinking system 10, waste paper stock 13 from a pulper or the like is supplied to an inlet stock tank 14, which includes agitators or the like to maintain a consistent suspension of the fibers in the slurry. A supply line 16 fed by a pump 17 extends between the inlet stock tank 14, and an inlet end 18 of the pressurized flotation module. Those skilled in the art will recognize that the inlet of the module can be fed other than by a pump. For example, gravity feed can also be used. At the opposite end of the pressurized flotation module from the inlet end 18 there is disposed an outlet end 19, including a deinked pulp outlet 20 and an inky foam rejects outlet 22. A recycle loop 24 extends between a deinked pulp outlet line 26 and the inlet stock tank 14. The recycle loop 24 permits a controllable portion of the deinked stock to be recycled, thereby maintaining the desired level of ink removal without having to provide series of deinking apparatus. A rejects line 27 is provided for carrying the ink-laden foam away from the flotation module. The operation of the system utilizing a pressurized flotation module 12, according to the present invention, and particularly the recyclinq of a portion of the deinked slurry will be described in more detail hereinafter.

Various system controls such as valves 28, 30 and 32 are disposed in the foam rejects line 27, the deinked pulp line 26 and the recycle loop 24, respectively. Various other flow control valves, pumps and associated apparatus may also be required, all of which would be known by one skilled in the deinking art and will not be described in further detail herein.

Referring now more specifically to FIG. 2, and particularly the enlarged views in FIGS. 3, 4, 5 and 6, one embodiment of the pressurized flotation module 12 will be described in more detail. In FIGS. 2 through 6, the flotation module is shown to include a generally cylindrical main body portion 40, an inlet cone 42, and an outlet cone 44. It should be understood, however, that the flotation module, according to the present invention, can be constructed in different shapes such as elliotical or conical as well as the generally cylindrical shape shown, and the present description and claims are intended to include other such shapes as well. Further, while a generally horizontal arrangement is shown for the module, it should be understood that with minor modification a more generally vertical arrangement can be used. Several alternative embodiments of the pressurized flotation module will be described later herein.

The inlet cone 42 of module 12 is connected to an aeration mixing section 50, which receives the slurry from the inlet stock tank, and includes an air injection device 52, and a turbulent mixing section 54. A suitable type of aeration and mixing section for use with the present pressurized flotation module is shown in copending application U.S. Ser. No. 898,475 (now U.S. Pat. No. 4,861,165). It should be understood that various other forms of aeration and mixing sections can also be used.

Inlet cone 42 includes a first flange 60 with a plurality of bolt holes 62 or other suitable means for connecting the inlet cone to the supply line 16. A second flange 64 containing a plurality of bolt holes 66 is disposed at the opposite end of the cone for connecting the cone to body 40 of the pressurized flotation module. Extending between flange 60 and flange 64 is a generally diverging wall 68 of the inlet cone. The angle of expansion of wall 68 is important in that, if the angle is too great, the slurry flowing into the pressurized flotation module from the supply line may generate undesirable eddies and flow patterns, disrupting operation of the flotation module. It is desirable that the major flow path through the module be linear, so that the ink-laden bubbles in the slurry can rise to the top of the slurry flowing through the flotation module without being caught up in, or ruptured by eddies in the slurry. For these reasons, it has been found that an angle of expansion for the inlet cone of 40° or less is desirable, and preferably the angle of expansion will be less than 30°. The gradually expanding wall 68 slows the fluid velocity of the slurry as it enters the module, thereby allowing the bubbles in the slurry to rise through the slurry. Alternatively, diffusers can be used to slow the fluid velocity.

Body 40 includes flanges 70 and 72, each having a plurality of bolt holes 74, for connecting the body to the inlet and outlet cones respectively. As mentioned previously, body 40 can be of many different shapes, generally defined by a wall 76 formed in, for example, the cylindrical shape shown, an elliptical shape or a generally diverging cone shape. The body also includes legs 78 and 79 for supporting the module. Generally, it has been found that a gradual upward rise from the inlet end to the outlet end is desirable, at least along the upper portion of body 40. Therefore, leg 79 is generally longer than leg 78. In one model of the invention, a 6" rise over a 7' body 40 length was found to be appropriate.

Outlet cone 44 includes a flange 80 with a plurality of bolt holes 82 for connecting the outlet cone to the body 40. It will be understood by those skilled in the art that other than bolt-type connections may be used for securing the inlet and outlet cones to the body 40, and for securing the cones to the various slurry conduits in the system. With the flange and bolt-type connections, normally a gasket, not shown, will be disposed between the adjacent flanges to provide a positive seal.

Outlet cone 44 further includes a generally horizontally extending outlet wall 90, having a flange 92 with a plurality of bolt holes 94, for connecting the outlet cone to the deinked pulp line 26. Extending between the inner end of wall 90 and flange 80 is a conical wall 96. Disposed in wall 96 on the upper portion thereof, near the outlet wall 90, is a flange housing 98 for connecting the outlet cone to the ink-laden reject line 27.

To separate the slurry accepts outlet from the reject outlet a baffle assembly 100 is disposed in the pressurized flotation module, and includes an angularly upwardly extending baffle plate 102 projecting inwardly from wall 90, having a weir plate 104 on its distal end. As with the angular wall of the inlet cone 42, the baffle plate 102 should form an angle from the horizontal of approximately 40° or less, and preferably less than 30°. If the angle from the horizontal of the baffle plate 102 is too great, undesirable flow patterns are generated near the outlet end, which can cause air and/or foam rejects to be drawn along with the acceptable slurry through the accepts outlet. It has been found that an angle of less than about 30° from the horizontal substantially minimizes turbulence and the formation of eddies, and promotes the desirable linear flow through the outlet.

Weir plate 104 extends substantially vertically upward from the baffle plate and provides a zone along its length, which accommodates and dampens surface waves in the module and allows for fluctuation in the slurry level. With the upper portion of wall 96, the baffle assembly 100 forms a substantially enclosed rejects outlet chamber 110, with the only opening thereto being a throat 112 above weir plate 104.

In the method of the present invention, a gas is mixed with a slurry containing at least one constituent to be removed. The slurry with the gas dispersed and dissolved therein is fed to an enclosed vessel wherein the gas is allowed to rise to the surface of the slurry, carrying the constituent with it, and generating a foam on the slurry. Gas escaping from the slurry and foam is captured in the vessel, and forces the foam through a rejects outlet, with the slurry flowing through an accepts outlet. Flow control is maintained on at least one of the slurry inlet or the rejects outlet to control the flow and pressure in the module. As a variation to the method, the invention contemplates providing vacuum at the rejects outlet to maintain a negative pressure in the module.

In the use and operation of a pressurized flotation module according to the present invention, particularly one such as module 12 shown in FIGS. 2 through 6, and in a deinking system as disclosed in FIG. 1, slurry from stock tank 14 is pumped to the flotation module through the aeration and mixing section 50. Air is injected into the slurry and is turbulently mixed therewith in the turbulent mixing section 54. The aerated slurry enters the flotation module through inlet cone 42. The gentle angle of expansion in the inlet cone permits a gradual dispersion of the slurry into the module, with a corresponding decrease in fluid velocity. As the slurry flows under pressure through the module, the ink-laden bubbles rise to the surface of the slurry. The various valves and pumps on the inlet and outlet lines are controlled to maintain a fluid level in the flotation module such that the fluid is above the bottom of weir plate 104 and below the top of the weir plate. As the zone above the surface of the slurry becomes filled with the foam, the foam is forced through throat 112 into the outlet chamber 110 by the air pressure created as air escapes from the slurry. The pressure forces the foam through the reject outlet without the need for pumps, paddles, vacuum or the like. It is desirable to keep the slurry level in the general area of the height of weir plate 104. If the slurry level rises above the top of the weir plate, acceptable fiber will be lost out the foam reject outlet. Preferably, the slurry level is sufficiently below the weir plate that surface waves will not crest over the top of the weir plate. If the slurry level falls below the bottom of weir plate 104, ink-laden foam can be drawn along with the acceptable slurry through the outlet 20.

A pressurized flotation module such as that just described can be operated with stock consistencies from about 0.1% to 5% solids, and can be used on all raw materials with any deinking chemistry. The pressurized module is able to efficiently handle high foaming stocks. One particular advantage of the present flotation module is that the foam laden reject flow is under pressure and is forced through a control valve 28. The high shear experienced by the foam in the control valve breaks down the foam at the valve so that the outlet from the valve is a liquid which is much easier to handle than the foam obtained in atmospheric flotation modules.

As mentioned previously, another of the distinct advantages of the present invention is that, through the use of recycle loops, a pressurized flotation module of minimal physical size can be used to remove the desired amount of contaminant. This is a result of the geometry presented by a the pressurized module, wherein the velocity through the module equals the flow rate $\div \pi \times r^2$. Thus, an increase in capacity is achieved by an increase in the radius, and since capacity varies with the square of the radius, a small increase in the radius of the module results in a substantial capacity increase.

By way of example, a 100 tons per day module may be slightly greater than three feet in diameter. In scaling this module up to the 500 tons per day capacity, the diameter would increase to only between four to five feet in diameter. As is known with other types of froth flotation cells, as the depth of the slurry increases, an increased length of flow in the module is required to provide sufficient slurry retention time to permit the bubbles to rise from the bottom of the slurry to the top of the slurry. Therefore, in addition to the moderate increase in the radius of the module of the present invention, as the module is scaled up for larger capacity, the length of the body 40 would also be increased to increase the slurry retention time.

As a result of the ease in which the module can be scaled upward for larger capacities, instead of using, for example, five 100 tons per day modules in series, as is frequently done with atmospheric flotation cells, a 500 ton per day module can be used with an 80% recycling of the flow from the accepts outlet 20. Alternatively, the accepts outlet of a small unit can be hooked directly to a second turbulent mixing section leading to a second flotation module. Even when a series of pressurized modules are used, capital savings are realized in that, since pressure is maintained in the module, pumping is not required between stages, as with atmospheric flotation cells in which pressure is lost in the cell. Normally, however, it is believed to be more efficient to recycle stock and use a larger module. A pressurized flotation module, according to the present invention, can be used in a deinking process in place of eleven stages of conventional atmospheric cells, so that, for example, a module of 1100 ton per day capacity, to achieve better than 90% cleaning efficiency, would recirculate 1,000 tons per day and produce 100 tons per day of cleaned slurry.

Figure 7:
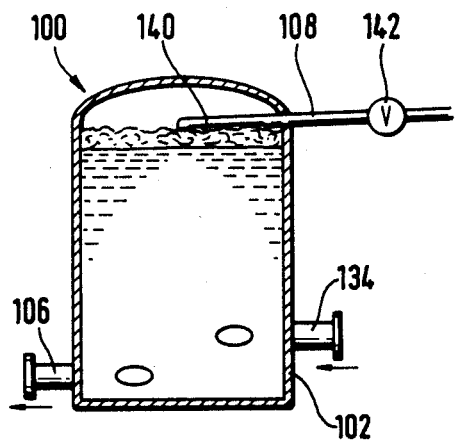
FIG. 7 is a vertical cross sectional view of an alternative embodiment for a pressurized flotation module.
Figure 8:
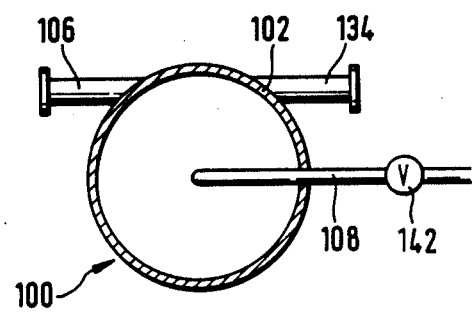
FIG. 8 is a top view of the module shown in FIG. 7.

As mentioned previously, there are numerous variations possible in the physical shape of the pressurized flotation module. In FIGS. 7 and 8 a modified embodiment is shown in which the module 100 is generally more vertically oriented than the module shown in FIGS. 2 thru 6. Module 100 includes an outer housing or wall 102, having a slurry inlet 104 and a slurry outlet 106 disposed in the lower portion thereof. Generally, it is preferred that the slurry inlet be located somewhat higher than the slurry outlet to prevent short-circuiting of contaminants directly from the inlet to the outlet. A foam reject pipe 108 is disposed in the upper portion of module 100 and includes an elongated orifice 110 along the bottom portion of the pipe, which orifice extends from the end of the pipe within the module to near the inner surface of wall 102. Suitable control mechanisms such as a valve 112 on the reject pipe are provided. In this embodiment, the contaminant-laden bubbles rise to the surface of the slurry, which is kept below the level of the reject pipe 108. The pressure in the module forces the foam from the surface into the reject pipe and out of the module for disposal.

Figure 9:
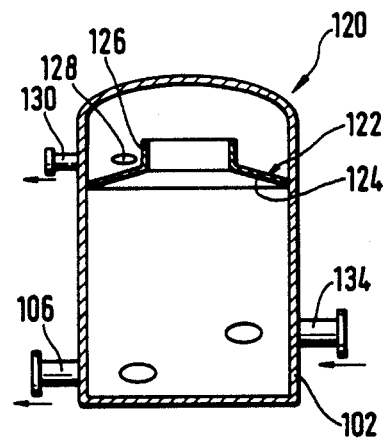
FIG. 9 is a vertical cross sectional view of yet another embodiment for a pressurized flotation module of the present invention.
Figure 10:
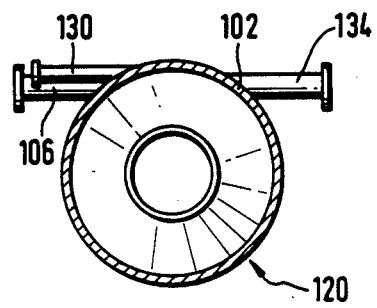
FIG. 10 is a top view of the module shown in FIG. 9.

A further embOdiment 120 of the pressurized module is shown in FIGS. 9 and 10. This embodiment is similar to module 100, having a outer wall 102, a stock inlet 104 and a stock outlet 106. The rejects are handled somewhat differently in module 120 in that a baffle assembly 122 is disposed in the upper portion of the flotation module, and includes an angularly upwardly extending plate section 124, projecting inwardly from the wall 102 and a substantially vertical weir plate 126 extending upwardly from the inner end of the plate 124. The baffle assembly with the module housing forms a reject outlet chamber generally designated with numeral 128. Foam enters the generally conically shaped chamber 128 by flowing over the top of weir plate 126. The pressure in the module forces the foam from the module through outlet 130.

Figure 11:
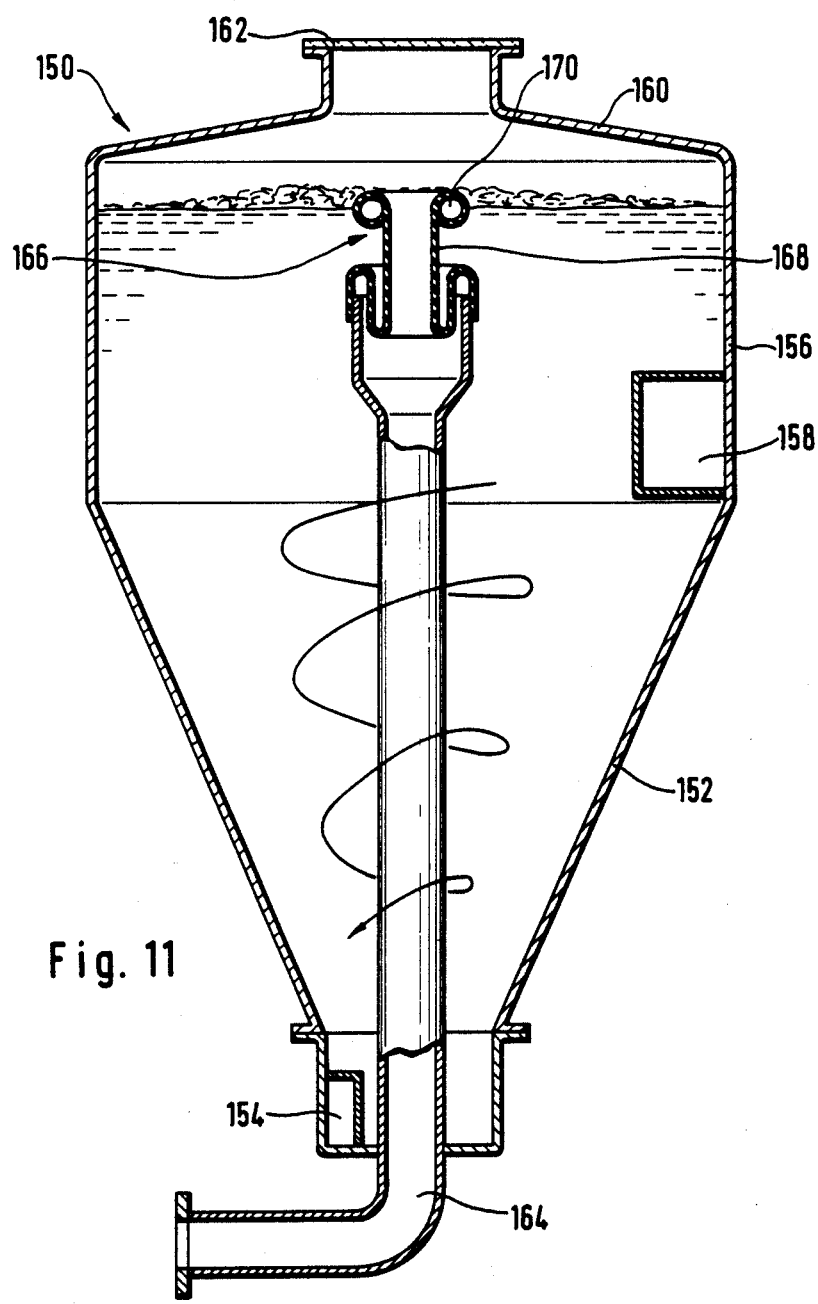
FIG. 11 is a vertical cross sectional view of still another embodiment for a pressurized flotation module.

Yet another modification for a vertical module is shown in FIG. 11. The pressurized flotation module 150 of this embodiment includes a lower conical housing 152, tapering towards a stock outlet 154. Rising above the conical housing is a substantially cylindrical housing 156, which includes the stock inlet 158. A dome 160, having a sight glass 162, is provided on top of the module. A central rejects pipe 164 is disposed in the module from near the top of the module, and extends out the bottom of the lower conical housing. In this embodiment a particularly advantageous baffle assembly 166 is shown, which includes a flexible baffle membrane 168 and a floating baffle ring 170. The ring 170 floats on the surface of the slurry, with a portion thereof rising above the slurry to prevent slurry from flowing into the rejects pipe. The foam generated on the surface of the slurry flows over the top of the baffle ring and out the reject pipe. The flexible membrane 168 can fold to overlap itself, and the baffle assembly shown herein automatically compensates for fluctuations in slurry surface level. This embodiment works similar to the previously described embodiments wherein the slurry enters the module, the bubbles rise to the surface of the slurry and flow over the baffle assembly into the rejects pipe. Acceptable slurry flows to the bottom of the module and out the outlet 154. The module is enclosed and the escaping air from the slurry is captured in the module and utilized to force the foam through the reject pipe.

The method and pressurized modules disclosed herein have application in separation processes other than deinking. For example, flotation separation techniques utilizing the present invention can be used to separate other contaminants, such as plastic, from pulp slurries, and can be used in mineral separation or the like. Clarification can be achieved by total flotation, which is substantially simplified by recirculation made possible in the present pressurized flotation module.

Further, while the invention has been described for operation at positive pressure, it is also possible to operate the flotation module at negative pressure. In this modification the rejects line would be connected to a vacuum source, and the area in the module above the liquid level would be maintained at a negative pressure. In this regard the invention varies from previous flotation apparatus wherein vacuum is used to skim foam off the slurry surface. In the present invention the entire module is enclosed. The present flotation module exhibits versatility, being operable over a pressure range of about minus 10 to positive 100 psi absolute pressure.

While various embodiments of a pressurized flotation module, and of a method for separating foam from a slurry under pressure have been described in detail herein, various changes may be made without it departing from the scope of the present invention.

We claim:

1. A flotation module for separating ink-laden bubbles from an aerated pulp slurry flowing through said module, said module comprising:
   a body defining a vertically oriented cone forming a slurry-conducting zone in which air bubbles from said aerated slurry are permitted to rise through the slurry as the slurry flows through said zone;
   an inlet means connected to said body and connected in flow communication with a slurry supply source;
   a slurry outlet means connected to said body for directing slurry flowing from said zone;

a bubble outlet means connected to said body for directing said bubbles in a flow from said zone;

said inlet means and said outlets means and said body defining a substantially closed pressure vessel;

flow control means disposed in flow communication with at least one of the inlet means, the slurry outlet means and the bubble outlet means to control the flow of slurry and bubbles to generate a slurry surface in said zone for accumulating bubbles thereon, said flow control means also controlling the flow of air from said module for maintaining the internal pressure in the module above atmospheric pressure;

said body defining said cone converging from said inlet means to said slurry outlet means, said slurry outlet means being downwardly disposed;

said bubble outlet means including a pipe extending within said cone; and said bubble outlet means further including a floatable baffle assembly connected to said pipe for limiting the flow of slurry into said pipe.

2. A foam floatation module for separating by floatation from a slurry fed therethrough, foam generated by mixing a gas with the slurry, said module comprising:

a sealed, horizontal, elongated body having a slurry inlet means near one end of said body, a slurry outlet means near the other end of said body, and a foam outlet means, each spaced apart from each other;

said slurry inlet means including a generally conically shaped wall diverging outwardly in the direction of slurry flow;

said body including a generally tubular shaped wall; and said slurry outlet means including a generally conically shaped wall converging inwardly in the direction of slurry flow, a baffle which extends angularly upwardly, and inwardly from a wall of said conically shaped slurry outlet means and defines with said wall a limited access chamber around said foam outlet means, said baffle including a vertically upwardly extending plate on the distal end thereof;

control means in flow communication with at least one of said inlet means and said outlet means for providing and maintaining a positive pressure in said body above atmospheric pressure; for controlling the flow of said slurry to less than fill said body, thereby generating a slurry surface; and for retaining the slurry between said inlet means and said outlet means for sufficient duration to permit gas near the bottom of said body to rise through said slurry to the surface thereof; and said control means directing gases escaping from the slurry to pass from said body with said foam through said foam outlet means.

3. A flotation module as defined in claim 2 in which said baffle extends upwardly at an angle of less than about 40° from the horizontal.

* * * * *